United States Patent
Liu et al.

(10) Patent No.: US 12,001,065 B1
(45) Date of Patent: Jun. 4, 2024

(54) PHOTONICS PACKAGE WITH TUNABLE LIQUID CRYSTAL LENS

(71) Applicant: GenXComm, Inc., Austin, TX (US)

(72) Inventors: Ke Liu, Austin, TX (US); Thein-An Nguyen, Austin, TX (US); Monireh Moayedi Pour Fard, Austin, TX (US)

(73) Assignee: ORCA Computing Limited, London (GB)

( * ) Notice: Subject to any disclaimer, the term of this patent is extended or adjusted under 35 U.S.C. 154(b) by 0 days.

(21) Appl. No.: 17/111,088

(22) Filed: Dec. 3, 2020

Related U.S. Application Data

(60) Provisional application No. 63/113,006, filed on Nov. 12, 2020.

(51) Int. Cl.
*G02B 6/42* (2006.01)
*G02B 6/122* (2006.01)

(52) U.S. Cl.
CPC ........... *G02B 6/4206* (2013.01); *G02B 6/122* (2013.01); *G02B 6/4212* (2013.01)

(58) Field of Classification Search
CPC ..... G02B 6/4206; G02B 6/122; G02B 6/4212
See application file for complete search history.

(56) References Cited

U.S. PATENT DOCUMENTS

| | | | |
|---|---|---|---|
| 4,608,569 A | 8/1986 | Dickey, Jr. et al. | |
| 5,377,289 A | 12/1994 | Johnson | |
| 5,444,864 A | 8/1995 | Smith | |
| 5,578,845 A | 11/1996 | Yoshiyuki et al. | |
| 5,699,176 A | 12/1997 | Cohen | |
| 5,701,371 A | 12/1997 | Ishida | |
| RE35,736 E | 2/1998 | Powell | |
| 5,751,471 A * | 5/1998 | Chen | G02F 1/29 359/279 |
| 5,757,312 A | 5/1998 | Szmurlo | |
| 5,867,293 A | 2/1999 | Kotten | |
| 5,904,546 A | 5/1999 | Wood et al. | |
| 6,359,714 B1 | 3/2002 | Imajo | |

(Continued)

FOREIGN PATENT DOCUMENTS

| | | |
|---|---|---|
| CN | 101379718 | 3/2009 |
| CN | 104484852 | 4/2015 |

(Continued)

OTHER PUBLICATIONS

Kwak, MyoungJun, "The Impact of Loop Filter in Phase Locked Loop," Bachelor's Thesis Metropolia University of Applied Sciences, Feb. 19, 2019, 50 pages.

Lecture 150—Phase Noise—I (Jun. 20, 2003), P.E. Allen 2003, 2 pages.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

(Continued)

*Primary Examiner* — Ryan A Lepisto
*Assistant Examiner* — Erin D Chiem
(74) *Attorney, Agent, or Firm* — Fenwick & West LLP

(57) ABSTRACT

A photonics package that incorporates a liquid crystal lens situated between a light source and a waveguide or output element of the package. The liquid crystal lens may focus or collimate light passing through it. This may be useful, for example, to focus light from a light source on or at an entry of a waveguide. Certain embodiments may include or incorporate routing or optical elements between the light source and the liquid crystal lens, and/or on a side of the lens opposite a side on which the light source is located.

10 Claims, 6 Drawing Sheets

(56) References Cited

U.S. PATENT DOCUMENTS

| | | |
|---|---|---|
| 6,373,909 B2 | 4/2002 | Lindquist |
| 6,507,728 B1 | 1/2003 | Watanabe |
| 6,539,204 B1 | 3/2003 | Marsh |
| 6,567,648 B1 | 5/2003 | Ahn |
| 6,567,649 B2 | 5/2003 | Souissi |
| 6,745,018 B1 | 6/2004 | Zehavi |
| 6,751,447 B1 | 6/2004 | Jin |
| 6,760,454 B1 | 7/2004 | Shreve |
| 6,771,931 B2 | 8/2004 | Waltho |
| 6,778,319 B2 | 8/2004 | Chavez-Pirson |
| 6,873,639 B2 | 3/2005 | Zhang |
| 6,907,093 B2 | 6/2005 | Blount |
| 6,999,639 B2 | 2/2006 | Tsarev |
| 7,020,396 B2 | 3/2006 | Izadpanah |
| 7,058,368 B2 | 6/2006 | Nicholls |
| 7,064,697 B2 | 6/2006 | Taylor et al. |
| 7,085,497 B2 | 8/2006 | Tiemann |
| 7,116,484 B2 | 10/2006 | Nemoto |
| 7,123,676 B2 | 10/2006 | Gebara |
| 7,130,289 B2 | 10/2006 | Kuan et al. |
| 7,333,685 B2 * | 2/2008 | Stone .................. G02B 6/272 359/489.08 |
| 7,355,993 B2 | 4/2008 | Adkins |
| 7,366,244 B2 | 4/2008 | Gebara |
| 7,446,601 B2 | 11/2008 | LeChevalier |
| 7,496,257 B2 | 2/2009 | Levner |
| 7,509,054 B2 | 3/2009 | Calabro et al. |
| 7,566,634 B2 | 7/2009 | Beyne et al. |
| 7,650,080 B2 | 1/2010 | Yap |
| 7,660,531 B2 | 2/2010 | Lee |
| 7,672,643 B2 | 3/2010 | Loh |
| 7,680,368 B2 | 3/2010 | Welch et al. |
| 7,711,329 B2 | 5/2010 | Aparin |
| 7,720,029 B2 | 5/2010 | Orava |
| 7,729,431 B2 | 6/2010 | Gebara |
| 7,756,480 B2 | 7/2010 | Loh |
| 7,778,611 B2 | 8/2010 | Asai |
| 7,809,047 B2 | 10/2010 | Kummetz |
| 7,826,808 B2 | 11/2010 | Faulkner |
| 7,853,195 B2 | 12/2010 | Higgins |
| 7,869,527 B2 | 1/2011 | Vetter |
| 7,876,867 B2 | 1/2011 | Filipovic |
| 7,907,895 B2 | 3/2011 | Shinagawa |
| 7,917,177 B2 | 3/2011 | Bauman |
| 8,036,606 B2 | 10/2011 | Kenington |
| 8,055,235 B1 | 11/2011 | Gupta et al. |
| 8,078,130 B2 | 12/2011 | Fudge |
| 8,081,946 B2 | 12/2011 | Fudge |
| 8,098,779 B2 | 1/2012 | Komninakis et al. |
| 8,155,605 B2 | 4/2012 | Hwang |
| 8,170,487 B2 | 5/2012 | Sahota et al. |
| 8,233,872 B2 | 7/2012 | Nagai |
| 8,249,540 B1 | 8/2012 | Gupta |
| 8,270,843 B2 | 9/2012 | Nakamoto |
| 8,299,555 B2 | 10/2012 | Su et al. |
| 8,320,504 B2 | 11/2012 | Peng |
| 8,331,509 B2 | 12/2012 | Wang |
| 8,351,874 B2 | 1/2013 | Dent |
| 8,477,871 B2 | 7/2013 | Neumann |
| 8,521,090 B2 | 8/2013 | Kim |
| 8,526,903 B2 | 9/2013 | Gudem |
| 8,565,681 B2 | 10/2013 | Kim |
| 8,600,200 B1 | 12/2013 | Rakich et al. |
| 8,618,966 B2 | 12/2013 | Kanter |
| 8,682,170 B2 | 3/2014 | Prucnal |
| 8,693,810 B2 | 4/2014 | Suarez et al. |
| 8,730,786 B2 | 5/2014 | Wang |
| 8,781,030 B2 | 7/2014 | Peng |
| 8,785,332 B2 | 7/2014 | Johnson et al. |
| 8,805,298 B2 | 8/2014 | McCallister |
| 8,845,854 B2 | 9/2014 | Lei et al. |
| 8,867,928 B2 | 10/2014 | Piehler |
| 8,872,583 B2 | 10/2014 | Lee |
| 8,971,712 B2 | 3/2015 | Fan et al. |
| 8,977,223 B1 | 3/2015 | Gupta |
| 9,020,307 B2 | 4/2015 | Ishikawa |
| 9,077,440 B2 | 7/2015 | Wyville |
| 9,100,099 B2 | 8/2015 | Loh |
| 9,106,453 B2 | 8/2015 | Wang |
| 9,160,386 B2 | 10/2015 | Rimini |
| 9,178,635 B2 | 11/2015 | Ben-Shlomo |
| 9,184,902 B2 | 11/2015 | Khojastepour |
| 9,195,052 B2 | 11/2015 | Long |
| 9,214,718 B2 | 12/2015 | Mow |
| 9,224,650 B2 | 12/2015 | Lei et al. |
| 9,252,857 B2 | 2/2016 | Negus |
| 9,253,003 B1 | 2/2016 | Harel |
| 9,257,811 B2 | 2/2016 | Gao |
| 9,258,052 B2 | 2/2016 | George |
| 9,268,092 B1 | 2/2016 | Jarecki, Jr. |
| 9,312,895 B1 | 4/2016 | Gupta |
| 9,344,125 B2 | 5/2016 | Kpodzo |
| 9,344,139 B2 | 5/2016 | Sjoland |
| 9,385,268 B2 | 7/2016 | Minamiru et al. |
| 9,391,667 B2 | 7/2016 | Sundstrom |
| 9,438,288 B2 | 9/2016 | Feld |
| 9,450,623 B2 | 9/2016 | Weissman |
| 9,490,963 B2 | 11/2016 | Choi |
| 9,503,134 B2 | 11/2016 | Sadek et al. |
| 9,520,983 B2 | 12/2016 | Choi et al. |
| 9,520,985 B2 | 12/2016 | Choi |
| 9,571,205 B1 | 2/2017 | Suarez |
| 9,589,812 B2 | 3/2017 | Takahashi et al. |
| 9,602,149 B1 | 3/2017 | Tanzi |
| 9,608,718 B2 | 3/2017 | Monsen |
| 9,651,652 B2 | 5/2017 | Kpodzo et al. |
| 9,667,404 B2 | 5/2017 | Sjoland |
| 9,696,492 B1 | 7/2017 | Cox |
| 9,698,913 B2 | 7/2017 | Foster |
| 9,703,056 B2 | 7/2017 | Neelakantan et al. |
| 9,712,233 B1 | 7/2017 | Deng |
| 9,722,713 B2 | 8/2017 | Tanzi |
| 9,723,612 B2 | 8/2017 | Stapleton |
| 9,726,821 B2 | 8/2017 | Murray et al. |
| 9,735,056 B2 | 8/2017 | Takahashi et al. |
| 9,748,906 B2 | 8/2017 | Stewart |
| 9,768,852 B2 | 9/2017 | Ling |
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,887,862 B2 | 2/2018 | Zhou et al. |
| 9,900,044 B2 | 2/2018 | Sjoland |
| 9,923,593 B2 | 3/2018 | Andersson |
| 9,923,708 B2 | 3/2018 | Khandani |
| 9,948,377 B1 | 4/2018 | Kim et al. |
| 9,960,805 B2 | 5/2018 | Wyville |
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim et al. |
| 10,064,217 B2 | 8/2018 | Rajagopal et al. |
| 10,084,506 B2 | 9/2018 | Sjoland |
| 10,110,306 B2 | 10/2018 | Jain et al. |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,284,367 B1 | 5/2019 | Le Ngoc |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |

(56) References Cited

U.S. PATENT DOCUMENTS

| | | |
|---|---|---|
| 10,367,584 B2 | 7/2019 | Rakich |
| 10,418,775 B2 | 9/2019 | Gao |
| 10,439,287 B2 | 10/2019 | Ashrafi |
| 10,491,313 B2 | 11/2019 | Jain |
| 10,656,350 B2 | 5/2020 | Chen et al. |
| 10,663,663 B2 | 5/2020 | Painchaud |
| 10,673,519 B2 | 6/2020 | Hong |
| 10,727,945 B1 | 7/2020 | Nguyen et al. |
| 10,754,091 B1 | 8/2020 | Nagarajan |
| 10,873,877 B2 | 12/2020 | Jain et al. |
| 11,032,005 B2 | 6/2021 | Vishwanath et al. |
| 11,032,737 B2 | 6/2021 | Jain et al. |
| 11,159,498 B1 | 10/2021 | Mattis et al. |
| 11,215,755 B2 | 1/2022 | Liu et al. |
| 11,330,591 B2 | 5/2022 | Raghothaman et al. |
| 11,469,821 B2 | 11/2022 | Jain et al. |
| 2003/0161637 A1 | 8/2003 | Yamamoto |
| 2003/0165304 A1* | 9/2003 | Ohm ............... G02B 6/4206 385/88 |
| 2004/0151238 A1 | 8/2004 | Masenten |
| 2004/0264610 A1 | 12/2004 | Marro |
| 2005/0018127 A1* | 1/2005 | Galstian ............ G02F 1/29 349/200 |
| 2011/0065408 A1 | 3/2011 | Kenington |
| 2011/0065409 A1 | 3/2011 | Kenington |
| 2011/0134810 A1 | 6/2011 | Yamamoto et al. |
| 2013/0295980 A1 | 11/2013 | Reuven |
| 2014/0169236 A1 | 6/2014 | Choi |
| 2014/0177660 A1 | 6/2014 | Elmaanaoui |
| 2016/0103341 A1 | 4/2016 | Long |
| 2016/0202420 A1* | 7/2016 | Paquet ............... G02B 6/30 385/36 |
| 2017/0176780 A1 | 6/2017 | Levy et al. |
| 2018/0006795 A1 | 1/2018 | Raaf |
| 2018/0248627 A1 | 8/2018 | Daniel |
| 2019/0198999 A1 | 6/2019 | Ashrafi |
| 2020/0209476 A1 | 7/2020 | Mattis et al. |
| 2020/0304253 A1 | 9/2020 | Choi et al. |
| 2020/0305159 A1 | 9/2020 | Raghothaman et al. |
| 2021/0036779 A1 | 2/2021 | Nguyen et al. |
| 2021/0088724 A1 | 3/2021 | Liu et al. |
| 2021/0126669 A1 | 4/2021 | Roberts et al. |
| 2021/0153073 A1 | 5/2021 | Hain et al. |
| 2021/0297156 A1 | 9/2021 | Jain et al. |
| 2021/0336050 A1 | 10/2021 | Mattis et al. |
| 2022/0043211 A1 | 2/2022 | Mattis et al. |
| 2022/0263529 A1 | 8/2022 | Kokel et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | A 2011120120 | 6/2011 |
| JP | A 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Skyworks AN279, "Estimating Period Jitter from Phase Noise," Skyworks Solutions, Inc., Sep. 21, 2021, 8 pages.

Chang et al., "Full-duplex spectrum sensing in cognitive radios using optical self-interference cancellation," 2015 9th International Conference on Sensing Technology (ICST), IEEE, pp. 341-344, Dec. 8, 2015.

IBM, "Silicon Nanophotonic Packaging," https://researcher.watson.ibm.com/researcher/view_group_subpage.php?id=5522, Jul. 2016.

Li et al., "Multimode silicon photonics," Nanophotonics, vol. 8, No. 2, pp. 227-247, May 16, 2019.

Mothe et al., "Multichannel Microwave Photonics Signals Summation Device," IEEE *Photonics Technology Letters*, vol. 3, No. 3, pp. 140-142, Feb. 1, 2011.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Yoo et al., "Heterogeneous 2D/3D photonic integrated microsystems," *Microsystems & Nanoengineering*, 2, 16030, Aug. 2016.

Amiri, I.S. et al., "W-Band OFDM Transmission for Radio-Over-Fiber Link Using Solitonic Millimeter Wave Generated by MRR" (Aug. 2014) IEEE Journal of Quantum Electronics 50(8): 622-628.

Amiri, I.S. et al., "2X2 MIMO-OFDM-RoF generation and transmission of double V-Band signals using a microring resonator system" (Dec. 12, 2015) Optical and Quantum Electronics, Springer US, NY vol. 48:1 1-15.

Blumenthal, D.J., "Photonic integration for UV to IR applications" (2020) APL Photonics 5: 020903 (12 pages).

Huffman, T.A. et al., "Integrated Resonators in an Ultralow Loss Si3N4/SiO2 Platform for Multifunction Applications" (Jul./Aug. 2018) IEEE Journal of Selected Topics in Quantum Electronics vol. 24, No. 4 (9 pages).

Quan et al., "A Novel Phase Noise Mitigation Method for Full-Duplex Transceivers" *2019 11th International Conference on Wireless Communications and Signal Processing (WCSP) IEEE* Oct. 23, 2019 pp. 1-6.

Sahai et al., "Understanding the Impact of Phase Noise on Active Cancellation in Wireless Full-Duplex" *Asilomar Conference on Signals, Systems and Computers Conference Record, IEEE Computer Society* pp. 29-33 Nov. 12, 2012.

Syrjälä et al., "Analysis of Oscillator Phase-Noise Effects on Self-Interference Cancellation in Full-Duplex OFDM Radio Transceivers" IEEE Transactions on Wireless Communications vol. 13, No. 6, pp. 2977-2990 Jun. 6, 2014.

Zhu, D. et al., "Integrated photonics on thin-film lithium niobate" (Feb. 23, 2021) arxiv.org, Cornell University Library, 201 Olin Library Cornell University Ithaca, NY 14853 (94 pages).

* cited by examiner

PHOTONICS PACKAGE WITH TUNABLE LIQUID CRYSTAL LENS

CROSS-REFERENCE TO RELATED APPLICATION

This application is a nonprovisional of and claims the benefit under 35 U.S.C. § 119(e) of U.S. Provisional Patent Application No. 63/113,006, filed Nov. 12, 2020, the contents of which are incorporated herein by reference as if fully disclosed herein.

FIELD

The described embodiments relate generally to photonics packages incorporating a liquid crystal lens, and more particularly to a photonics package having a liquid crystal lens that can be tuned to focus, collimate, or steer light from a light source.

BACKGROUND

Photonics packages may be extraordinarily small and are used in many applications from telecommunications to next-generation computing device architectures. Photonics packages also have relatively small power requirements, making them suitable for incorporation into many devices.

However, photonics packaging processing may be difficult, costly, and time-consuming. Even small misalignments or other mismatches between components of a photonics package may lead to the package having unacceptable operation or even being inoperable. These mismatches may be introduced when components are made, during manufacture of the photonics package (for example, when the components are placed on a substrate), or as the photonics package ages or operates.

SUMMARY

One embodiment described herein takes the form of a photonics package, comprising: a light source operable to emit a light output; a tunable liquid crystal lens operable to switch between a base state and a light steering state, and configured to receive the light source; a waveguide configured to receive the light output; and optics configured to steer the light output; wherein the optics are positioned between the tunable liquid crystal lens and one of the light source or waveguide; the tunable liquid crystal lens switches from the base state to the light steering state in response to an applied voltage; and, when in the light steering state, the tunable liquid crystal lens steers the light output toward the waveguide or other optical components.

Another embodiment described herein takes the form of a method for operating a photonics package, comprising: emitting a light output from a light source; determining whether an operating parameter is acceptable; in response to determining that the operating parameter is unacceptable, tuning a liquid crystal lens through which the light output passes; in response to tuning the liquid crystal lens, determining that the operating parameter is acceptable; and in response to determining that the operating parameter is acceptable, maintaining the tuning of the liquid crystal lens.

These and other embodiments will be apparent upon reviewing the specification and figures in their entirety, and the foregoing are examples rather than limitations.

BRIEF DESCRIPTION OF THE DRAWINGS

The disclosure will be readily understood by the following detailed description in conjunction with the accompanying drawings, wherein like reference numerals designate like structural elements, and in which.

Figure 1:
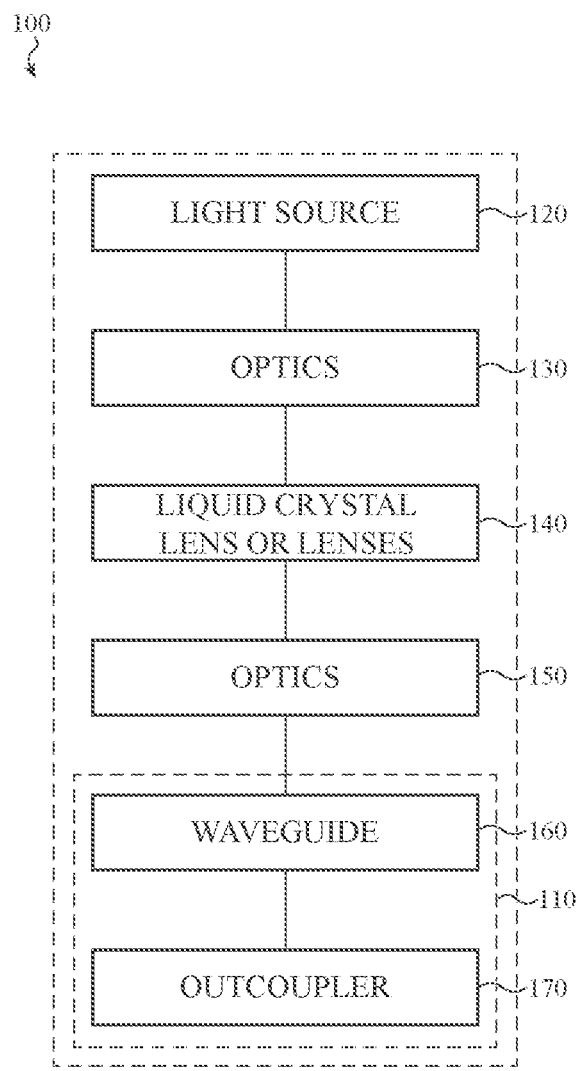
FIG. 1 generally depicts a sample photonics package incorporating a tunable liquid crystal lens.

The use of shading or cross-hatching is meant in indicate surfaces that have been cross-sectioned rather than any particular type of material or color. Structures, components, elements and the like shown in the accompanying figures are illustrative only and are not intended to convey or require any particular scale or spatial relationship.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Generally, embodiments described herein are directed to a photonics package, which may be or include one or more photonics integrated circuits ("PIC"), that incorporates a liquid crystal lens situated between a light source and a waveguide or output element of the package. The liquid crystal lens may focus or collimate light passing through it. This may be useful, for example, to focus light from a light source on an entry of a waveguide. Certain embodiments may include or incorporate routing or optical elements between the light source and the liquid crystal lens, as well as on a side of the lens opposite a side on which the light source is located. The term "optical element" generally refers to a structure through which light may pass and that alters a parameter of the light in some fashion, such as a lens, phase shifter, or collimator. A "routing element" is typically a structure that channels light or through which light propagates, such as a waveguide, mirror or other reflector, outcoupler, grating coupler, or the like.

The focusing/collimating properties of the liquid crystal lens may be changed by applying a voltage to the lens. The voltage may tune the liquid crystal lens' properties, adjusting the focal point of light passing through the lens as one example. As the voltage changes, the light's focal point may likewise change. In this manner, the liquid crystal lens may be dynamically tuned to account for variances in positioning of the lens, waveguide, light source, and/or other optics relative to one another. Such variances may arise during assembly of a photonics integrated circuit or other photonics package. In particular, pick and place operations used to set the various components of the photonics circuit may introduce small misalignments between components, insofar as the pick and place operations may have a minimum error in their ability to locate and/or position elements on a substrate.

Likewise, photonics circuits, structures, and the like (collectively, "photonics structures") may suffer from drift during operation and/or as they age. Thermal expansion may cause drift during operation, while components may shift as the photonics structure ages. Similarly, individual components of a photonics package may have relatively minor differences in dimension from one component to another. For example, two waveguides may have the same dimensions within a tens of nanometers tolerance (or the like), generally resulting from pick-and-place accuracy and/or dicing accuracy. Even minor differences in dimensions between otherwise identical components may lead to a mismatch in a photonics package; such mismatches may, in turn, yield reduced power or output from the photonics package, otherwise introduce signal loss, or may even result in inoperability. The dynamically tunable liquid crystal lens may offset these issues by steering light form a light source to another routing element of the photonics package, such as a waveguide, outcoupler, or the like.

"Steering," as that term is used here, refers to adjusting a focal length, focal point, angle, or width of light (e.g., spot size) (collectively, "parameters") passing through the liquid crystal lens. The light is "adjusted" insofar as it changes a parameter of the light when compared to the light propagating through the photonics package in the absence of the liquid crystal lens.

Additionally, the liquid crystal lens may be retuned periodically to ensure all or most light from a light source (whether LED, laser, laser diode, or otherwise) efficiently reaches a subsequent routing element in the photonics package. Thus, if the photonics package suffers an impact that misaligns the light source from the routing element, the liquid crystal lens may be retuned to offset the misalignment. Likewise, the liquid crystal lens may be retuned one or more times during the photonics package's operation to account for thermal drift, thermal expansion, and so on. Some embodiments may monitor an ambient temperature or the temperature of one or more elements of the photonics package and tune the liquid crystal lens accordingly. For example, as the temperature of a light source increases, the liquid crystal lens may be retuned to account for thermal effects due to this rising temperature.

Although embodiments are generally discussed herein as employing a tunable liquid crystal lens between a light source and a waveguide (with or without intervening optics), it should be appreciated that a tunable liquid crystal lens can be placed and used between PICs, between a PIC and a fiber output, between a PIC and a detector, or generally between a PIC and any other optical structure or element. Collectively, these, along with a waveguide, are termed "optical output structures." Accordingly, in any embodiment described herein, the waveguide and/or light source may be replaced with any of the foregoing optical output structures or elements.

These and other embodiments are discussed below with reference to FIGS. 1-6. However, those skilled in the art will readily appreciate that the detailed description given herein with respect to these Figures is for explanatory purposes only and should not be construed as limiting.

FIG. 1 generally depicts a sample photonics package 100 that may incorporate a tunable liquid crystal lens. The photonics package 100 may include a photonics integrated circuit 110 as well as various optical elements that are not part of the PIC. The PIC 110 and other optical elements may be mounted to a common substrate to form the photonics package 100. Accordingly, it should be understood that the photonics package 100 includes not only the PIC 110, but can (in some embodiments) include separate elements that are mounted to the common substrate, free space optical elements, and the like.

As one example and as shown in FIG. 1, the photonics package 100 may include a light source 120, initial optics 130, a liquid crystal lens 140, and secondary optics 150 in addition to the photonics integrated circuit 110. Similarly, the photonics integrated circuit 110 may incorporate a waveguide 160 (or any other optical output structure), an outcoupler 170, and any other suitable element that adjusts or directs light. Such suitable elements may include, by way of example and not limitation, multiplexers, demultiplexers, Echelle gratings, couplers, collimators, and the like.

The light source 120 emits a light output that is ultimately received by the PIC 110. The light is typically divergent light, although this is not necessary in all embodiments. The light source 120 may be a laser diode, a III-V laser, or the like. In some embodiments, the light source 120 may be part of the PIC 110 while in other cases (and as shown in FIG. 1) it may be located off-chip.

The light output emitted from the light source 120 may pass through initial optics 130. Initial optics 130 may be any optical element(s) that shape or adjust the emitted light output. Examples of initial optics 130 include a lens (including ball lenses, spherical lenses, aspheric lenses, cylindrical lenses, and so on), prisms (including micro-prisms), mirrors, and other reflective, refractive, or light-steering elements. Initial optics 130 may be omitted in certain embodiments.

In some embodiments, the initial optics 130 may take the form of, or may incorporate, an optical isolator. The isolator may reduce feedback to the light source, thereby increasing stability of the light source's light output.

The initial optics 130 may steer the light output from the light source 120. For example, the initial optics 130 may include a lens that focuses or collimates light, such as a ball lens. The light may be steered by the initial optics prior to the light being focused (or otherwise steered) by the liquid crystal lens 140. The light received by the initial optics 130 may be collimated light from a laser, divergent light from a laser diode, convergent light from another optical element, and so on.

The liquid crystal lens 140 may be located between the initial optics 130 and secondary optics 150, as shown in FIG. 1. In some embodiments, one or both of the initial optics 130 and secondary optics 150 may be omitted, so that the liquid crystal lens 140 receives the light output directly from the light source 110 and/or passes the light output directly to the waveguide 160 (or other element of the PIC 110). The liquid crystal lens 140 may be electrically tunable, such that applying a voltage to the liquid crystal lens 140 changes a focal length, propagation path, propagation angle, spot size, or other parameter of the light output. The liquid crystal lens 140 may steer the light output not only by changing the focal point of the light, but also by adjusting an output angle of the light output as it passes through the liquid crystal lens 140 (e.g., adjusting the propagation angle and/or propagation path). Put another way, the liquid crystal lens 140 may "bend" the light to account or compensate for out-of-tolerance placement or positioning of the waveguide 160 relative to the light source 120 (e.g., mismatch between the light source and waveguide or other optical output structure). Changing a focal point, output angle, output path, spot size, or other parameter of the light output are all examples of steering the light output by the liquid crystal lens 140.

In some embodiments, the liquid crystal lens 140 may be variably tunable and/or dynamically tunable. A "variably tunable" liquid crystal lens 140 may adjust steering of the light output across a range of values or options, rather than in merely a binary on/off manner. For example, as voltage increases, the light's focal length may continue to change or its output angle may continue to change. For variably tunable liquid crystal lenses 140, the amount of steering done by the lens may vary with a voltage applied to the lens. By contrast, a "dynamically tunable" liquid crystal lens 140 may have voltage applied at different times during operation of the photonics package 100. The dynamically tunable liquid crystal lens 140 may vary voltage during operation to account for changes in an operating parameter of the photonics package such as thermal expansion or drift, for example. While some examples of a liquid crystal lens 140 may be both variably tunable and dynamically tunable, other examples may be only one of variably tunable or dynamically tunable.

Although FIG. 1 illustrates a photonics package having a single liquid crystal lens 140, certain embodiments may employ multiple liquid crystal lenses 140. Similarly, multiple liquid crystal lenses 140 may be packaged together and, optionally, share a common substrate or layer, as discussed below with respect to FIGS. 2 and 3. Further, some embodiments may employ a liquid crystal lens 140 between the light source 120 and initial optics 130 or between the secondary optics 150 and waveguide 160.

The light output may be steered by the liquid crystal lens 140 to the secondary optics 150, generally to account or compensate for some mismatch in the photonics package between the light source 120 and the waveguide 160. As with the initial optics 130, the secondary optics 150 may be any element, or combination of elements, that steers the light output received from the liquid crystal lens. The secondary optics may be one or more of a ball lens, cylindrical lens, aspheric lens, spherical lens, mirror or other reflector, microprism or other refractor, collimator, or the like. The secondary optics 150 generally steer the light output from the liquid crystal lens 140 to the waveguide 160 of the PIC 110 (or other input element of the PIC, or other optical output structure). In some embodiments, the secondary optics 150 may be omitted. In many embodiments, the initial optics 130 and the secondary optics 150 may be the same optical elements, although in other embodiments they may be different. In certain embodiments, the liquid crystal lens 140 may steer the light output to one of a number of different elements, such as different optics or different waveguide inputs, rather than to a single element or input. Thus, in these embodiments the liquid crystal lens may be used to select or alter a light path in addition to, or instead of, fixedly steering light to a single component.

Additionally, some embodiments may place an index-matching material, such as an epoxy, between the tunable liquid crystal lens 140 and either or both of the initial optics 130 and secondary optics 150. This index-matching material may reduce reflection loss without significantly impacting performance of the photonics package 100. In some embodiments, the index-matching material has a refractive index of about 1.5 to 1.6, and in certain embodiments the refractive index is 1.55.

The PIC 110 generally includes a waveguide or other input element that receives the steered light output from the secondary optics 150. The light output propagates from the waveguide through the PIC, and ultimately to an outcoupler 170 that emits the light output from the PIC 110. It should be appreciated that the waveguide 160 may not be coupled directly to the outcoupler 170 in many embodiments. Rather, intermediary photonics circuitry may separate the two, such that the light output travels through this intermediary photonics circuitry. Examples of such circuitry include multiplexers, demultiplexers, collimators, gratings, couplers, decouplers, additional waveguides, modulators, filters, other optical output structures, and so on. Such circuitry is omitted from FIG. 1 for the sake of simplicity. In some embodiments, the waveguide 160 may be replaced by a prism, mirror, or other reflector. Likewise, in some embodiments, the outcoupler 170 may take the form of a grating coupler, cavity dumper, and so on.

Generally, then, the function of the liquid crystal lens 140 is to steer a light output from the light source 120 to the waveguide 160, regardless of whether the light source 120 is a laser diode, LED, laser, or other light source. In ideal photonics packages 100 the liquid crystal lens 140 may not actively steer the light output in any way. Practically speaking, however, ideal photonics packages 100 are difficult or even impossible to achieve. Pick and place operations are often used to align the light source 120, initial optics 130, secondary optics 150, and/or PIC 110 on a common substrate or otherwise with respect to one another. Fiducials used for pick and place operations may be slightly misaligned in some instances; in others, pick and place machinery may have an inherent placement tolerance. During operation, components such as the light source 120 may undergo thermal expansion. The light source may experience thermal drift, as well. Any two instances of the same component (such as the light source 120, optics 130, 150, and so on) may have slightly different dimensions resulting from manufacturing limitations. Components and/or the substrate on which the components rest may experience volumetric change as the photonics package is cured during assembly.

Any and all of the foregoing may result in misalignment of the light source 120 with respect to the waveguide 160 (or other optical output structure), which reduces coupling efficiency between the two and ultimately results in output loss from the PIC 110. The tunable liquid crystal lens 140 may steer the light to account for such misalignment, thereby increasing coupling efficiency and delivering a greater percentage of the light output from the light source 120 to the waveguide 160. Not only may this result in greater efficiency, it may increase part yield during manufacture of photonics packages. Embodiments employing a tunable liquid crystal lens 140 may mitigate as much as 2-8 dB of optical power that might otherwise be lost.

It should be appreciated that multiple liquid crystal lenses may be used in a single embodiment, although embodiments described herein illustrate the use of a single liquid crystal lens. Further, in embodiments employing multiple tunable liquid crystal lenses, such lenses may be optically coupled to one another, optically separated from one another by intervening optics, or both (e.g., some liquid crystal lenses may be optically coupled to one another while others are optically coupled to other structures, such as optics).

Figure 2:
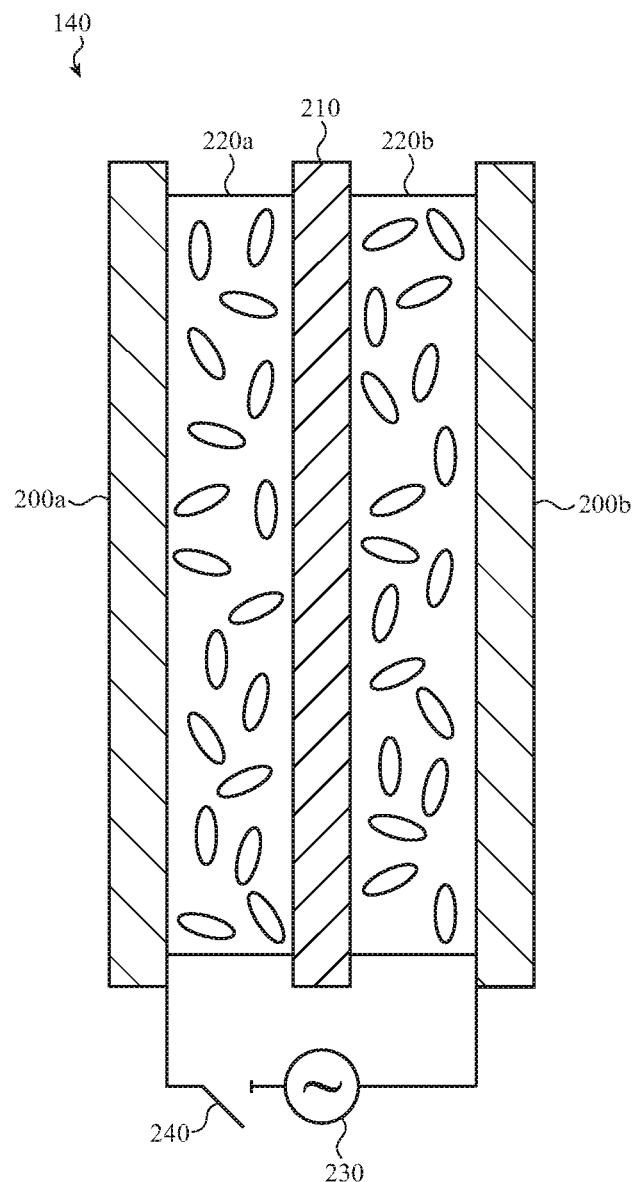
FIG. 2 is a cross-sectional view of a sample tunable liquid crystal lens with no voltage applied to the lens.
Figure 3:
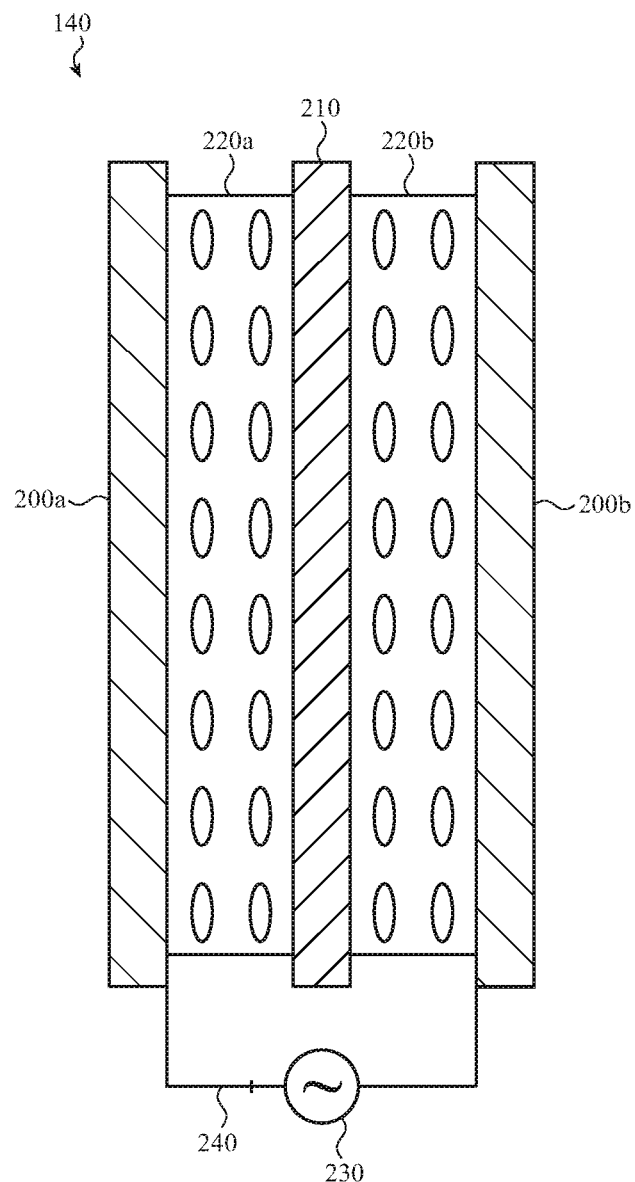
FIG. 3 shows the tunable liquid crystal lens with an applied voltage.

FIG. 2 is a cross-sectional view of a sample tunable liquid crystal lens 140 with no voltage applied to the lens, while FIG. 3 shows the tunable liquid crystal lens 140 with an applied voltage. The liquid crystal lens 140 structure shown in FIGS. 2 and 3 is but one example structure, and other liquid crystal lenses may be used in various embodiments.

Generally, the liquid crystal lens 140 has first and second liquid crystal layers 220a, 220b separated by a common substrate 210. First and second exterior substrates 200a, 200b bound the outer sides of the liquid crystal lens. Generally, the common substrate 210 and exterior substrates 200a, 200b are optically transparent such that the light output from the light source 120 (as shown in FIG. 1) may pass through an entirety of the liquid crystal lens 140 under certain circumstances.

The common substrate 210, first exterior substrate 200a, and second exterior substrate 200b may be formed from glass, polymer, crystal, or the like. The substrates 210, 200a, 200b are generally transparent to the wavelengths of the light output, although they may reflect or refract other wavelengths of light. In some embodiments, one or more of the substrates 210, 200a, 200b may include a polarizer, insulator, or the like, although this is not necessary. Typically, an electrode is formed on each of the exterior substrates 200a, 200b; generally, the electrode is formed or deposited on an interior surface of each exterior substrate (e.g., the surfaces contacting the liquid crystal layers 220a, 220b). The electrodes are generally formed from indium-tin-oxide, silver nanowires (or other metal nanomaterials), carbon nanotubes, conductive polymers, or other materials that are substantially transparent with respect to the wavelengths of the light output. In this manner, the electrodes do not block the light output as it passes through the liquid crystal lens 140.

A voltage source 230 is connected to the second exterior substrate 200b and, through a switch 240, to the first exterior substrate 200a. (In some embodiments, the switch may be positioned between the voltage source 230 and the second exterior substrate 200b instead). In particular, the voltage source 230 is connected to the electrodes of the exterior substrates 200a, 200b. When the switch 240 is open, no voltage is applied to the substrate electrodes; closing the switch 240 applies a voltage across the electrodes.

As shown in FIG. 2, when no voltage is applied to the liquid crystal lens 140, the liquid crystals in the layers 220a, 220b are unaligned. Accordingly, the liquid crystal lens 140 is in a base state, in which the lens may steer the light output by a base amount. This base steering by the liquid crystal lens 140 may adjust a parameter of the light output by a fixed amount or percentage, or may have no effect at all on any parameter, depending on the embodiment. Thus, in some embodiments, when no voltage is applied to the liquid crystal lens 140 the light output behaves exactly as it would if the liquid crystal lens 140 were absent; in other embodiments, this may not be the case.

When the switch 240 is closed as shown in FIG. 3, the voltage source 230 applies a voltage across the electrodes of the first and second exterior substrates 200a, 200b and the liquid crystal lens 140 enters a light steering state. The voltage causes the liquid crystals in the liquid crystal layers 220a, 220b to align, as shown in the figure. When the liquid crystal layers 220a, 220b are in this light steering state, the light output from the light source 120 is steered by the liquid crystal lens 140. Generally, the configuration shown in FIG. 3, where the liquid crystals are fully or near-fully aligned, may correspond to the tunable liquid crystal lens 140 maximally steering the light output. Further, although FIG. 3 shows the crystals as fully aligned along axes running from a top to a bottom of the liquid crystal lens 140, it should be understood that this is shown for illustrative purposes only. The liquid crystals may be "fully aligned" when their major axes are parallel to one another, or in any other position where the crystals are generally axially aligned with one another.

Some embodiments may be binary, where the liquid crystal layers 220a, 220b switch back and forth between the configurations shown in FIGS. 2 and 3 (e.g., the base state and light steering state) and have no other stable states. Other embodiments may vary alignment of the liquid crystals in the liquid crystal layers 220a, 220b with the amount of voltage applied by the voltage source 230 to the electrodes of the exterior substrates 200a, 200b. Thus, at zero voltage, the liquid crystal lens 140 may be in the state shown in FIG. 2, corresponding to a minimal or zero steering state. When a voltage equal to or above a threshold is applied by the voltage source 230, the liquid crystal lens 140 may be in the state shown in FIG. 3, corresponding to a maximal light steering state. Voltages between zero and the threshold voltage, as applied to the liquid crystal lens 140, may cause the lens to steer the light input progressively more (e.g., enter or occupy a series of increasing light steering states). That is, as the voltage increases, the amount of steering performed by the liquid crystal lens 140 likewise increases. Liquid crystal lenses 140 where light steering corresponds to applied voltage, such that there are multiple increasing light steering states, are examples of variably tunable liquid crystal lenses.

Variably tunable liquid crystal lenses 140 may operate according to a step function, where voltage is applied in discrete steps and so the light source is steered in discrete steps. Other variably tunable liquid crystal lenses may operate in a non-stepped, smoother manner where applied voltage may be more finely controlled and so light steering may be correspondingly finely controlled. In some embodiments, maximal steering may correspond to a complete blockage of light by the liquid crystal lens 140, while in others maximal steering results in maximum adjustment of a parameter (such as spot size, propagation angle, focal length, and the like) by the liquid crystal lens.

Some liquid crystal lenses 140 are dynamically tunable. That is, the voltage source 230 may apply voltage to the exterior substrates 200a, 200b when operating parameters of the photonics package require the light output to be steered. A feedforward or feedback loop may be used to determine when to apply such voltage, as examples. Parameters such as coupling efficiency, optical power output, temperature, size, and the like of the photonics package (or individual components thereof) may be measured by a sensor. The sensor's output may be used in the aforementioned feedback or feedforward loop to determine when to apply the voltage to the liquid crystal lens 140 in order to steer the light output, and for how long. Such sensors and loop control schemes may likewise be employed with variably tunable lenses. Many embodiments employ liquid crystal lenses 140 that are both variably and dynamically tunable.

The foregoing discussion of FIGS. 2 and 3 presume that the liquid crystals of the liquid crystal lens 140 are aligned when a voltage is applied by the voltage source 230 and unaligned when there is no applied voltage. It should be appreciated that some embodiments apply a constant minimum voltage to the liquid crystal lens 140, and so references to a zero voltage may, in some embodiments, encompass a minimum positive voltage. Likewise, although the liquid crystal lens is discussed as having its electrodes on the exterior substrates 200a, 200b, it should be appreciated that this is but one example position of the electrodes. One or more of the electrodes may be on a side of the common substrate 210, for example, particularly if at least one of the exterior substrates is grounded.

Figure 4:
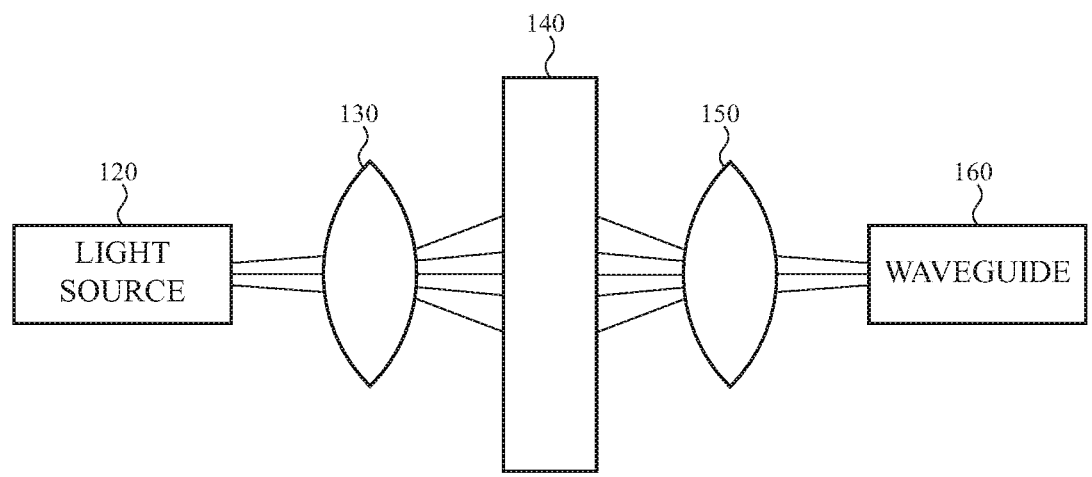
FIG. 4 illustrates one sample operation of the liquid crystal lens.

FIG. 4 illustrates one sample operation of the liquid crystal lens 140. Here, the light output from the light source 120 is spread by the initial optics 130 and impacts the liquid crystal lens 140. The liquid crystal lens 140, in turn, focuses the light output (e.g., adjusts its focal length) on or in the secondary optics 150. The secondary optics, in turn, may further focus or collimate the light such that it propagates to the waveguide 160 or other optical output structure. Thus, the liquid crystal lens 140 acts as a positive lens.

Figure 5:
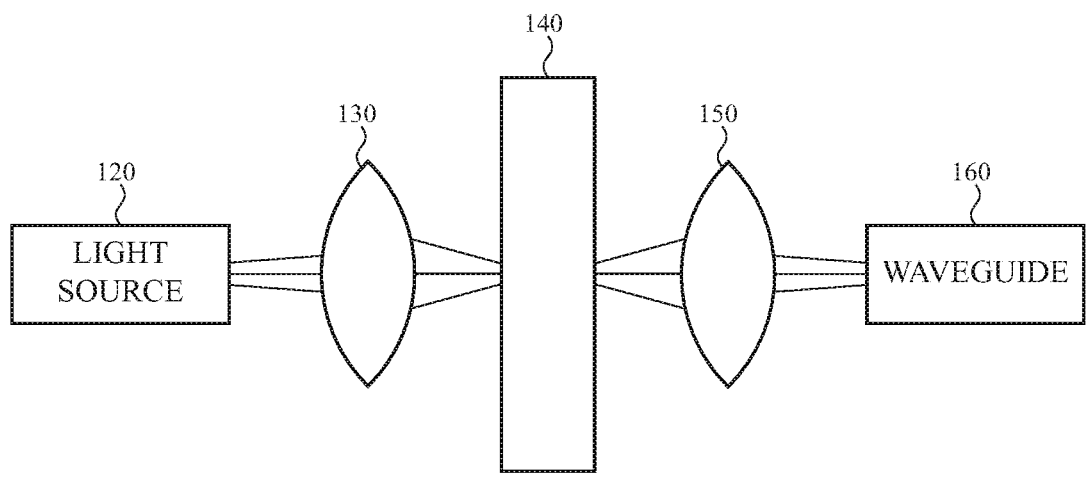
FIG. 5 illustrates an embodiment similar to FIG. 4, except that the liquid crystal lens spreads the light output from the light source rather than focuses it.

FIG. 5 illustrates an embodiment similar to FIG. 4, except that the liquid crystal lens 140 spreads the light output from the light source 120 rather than focuses it. Here, the liquid crystal lens 140 acts as a negative lens. Whether the liquid crystal lens 140 acts as a positive or negative lens may depend on a degree and/or nature of the mismatch between the light source 120 and the waveguide 160 of the photonics package 100. It should be appreciated that, in many embodiments, a liquid crystal lens 140 may operate in either fashion. Other embodiments may employ multiple liquid crystal lenses 140, with some functioning as positive lenses and some as negative lenses.

Figure 6:
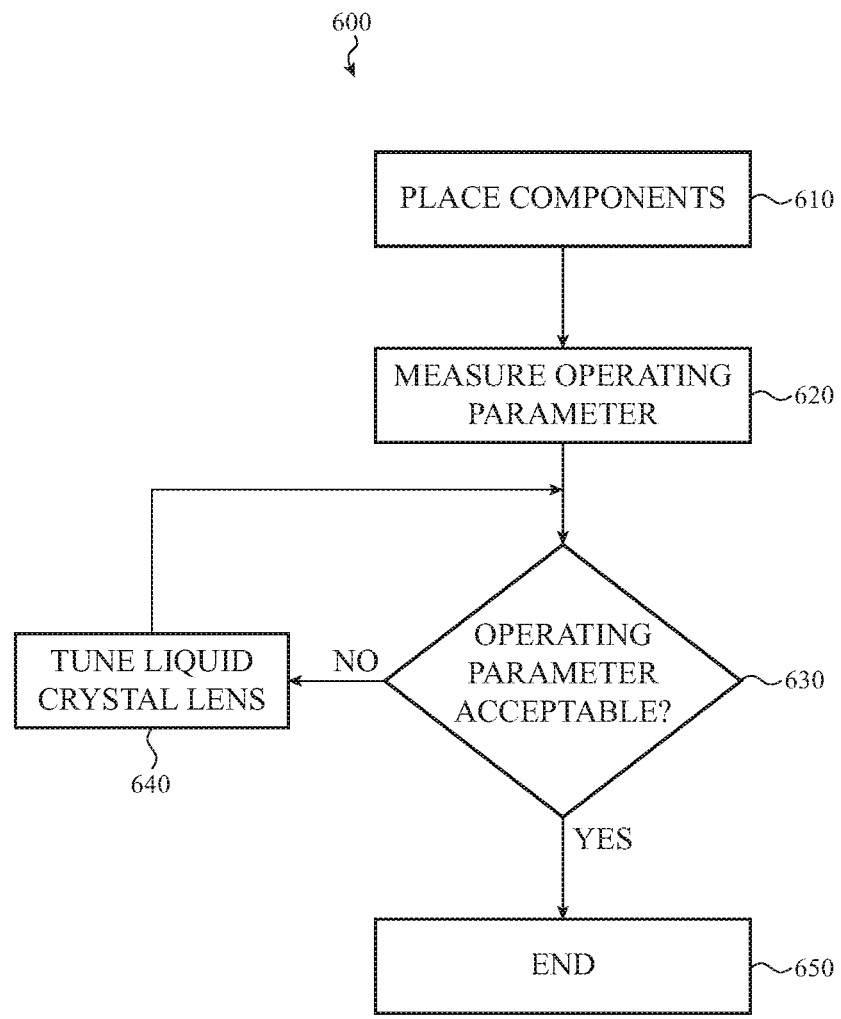
FIG. 6 is a flowchart illustrating a method for using a liquid crystal lens to adjust an optical output of a photonics package.

FIG. 6 is a flowchart illustrating a sample method 600 for using a liquid crystal lens to adjust an optical output of a photonics package. Initially, the various components of the photonic package are placed in operation 610. This may be through a pick and place operation, growing or depositing certain components on a substrate, or the like.

In operation 620, the photonics package is activated and an operating parameter of the photonics package is measured. This measurement may be performed by a sensor that is part of the photonics package or by one that is separate therefrom. A separate sensor may be used during bench testing, reliability testing, or manufacture, for example. An integrated sensor may be used in these scenarios as well and/or may be used during normal operation of the photonics package. "Operating parameters" may include a temperature, size, volume, angular alignment, efficiency, output and so on of the photonics package as a whole or any individual component of the photonics package.

In operation 630, it is determined whether the operating parameter is acceptable. In some cases this equates to determining if the operating parameter is above a threshold (as where the operating parameter is coupling efficiency, output power, or the like), below a threshold (as where the operating parameter is temperature, drift, angular alignment, volume, and so on), or equal to a number (as where the operating parameter is a binary value).

If the operating parameter is acceptable, then the method 600 proceeds to end state 650. If the operating parameter is not acceptable then the method proceeds to operation 640, in which the liquid crystal lens is tuned to steer a light output from a light source. Following operation 640, the method 600 returns to operation 630. This loop of operations 630 and 640 may be performed until the operating parameter is acceptable, at which point the method ends in end state 650.

The method 600 may be performed when the photonics package is initially assembled to ensure it operates within acceptable parameters. Additionally, operations 620-650 may be performed at various times (or substantially continuously) while the photonics package operates or is in service. Some embodiments may execute operations 620-650 in response to a specific event, such as a drop, shock, or impact, or after a specified time period (e.g., to account for aging). Some embodiments may perform these operations every time the photonics package is activated or deactivated.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A photonic integrated circuit package, comprising:
   a substrate;
   a light source disposed on the substrate and operable to emit a light output;
   a tunable liquid crystal lens disposed on the substrate and comprising:
      a first exterior substrate comprising a first electrode conductively coupled to a voltage source;
      an interior substrate;
      a second exterior substrate comprising a second electrode conductively coupled to at least one of the voltage source or to ground potential;
      a first liquid crystal layer interposing the first exterior substrate and the interior substrate; and
      a second liquid crystal layer interposing the interior substrate and the second exterior substrate, wherein the tunable liquid crystal lens is operable to switch between:
         a base state in which a first voltage is applied by the voltage source across the first electrode and the second electrode; and
         a light steering state in which a second voltage is applied by the voltage source across the first electrode and the second electrode;
   first optics interposing the light source and the tunable liquid crystal lens, disposed on the substrate, and comprising an optical isolator coupled to the light source and configured to receive light as output by the light source;
   an integrated waveguide disposed on the substrate;
   second optics interposing the tunable liquid crystal lens and the integrated waveguide and disposed on the substrate, the second optics configured to cooperate with the tunable liquid crystal lens to direct light output from the light source onto an input facet of the integrated waveguide when the tunable liquid crystal lens is in the base state; and
   an integrated sensor disposed on the substrate and configured to determine an operating parameter of the photonic integrated circuit package, the operating parameter comprising at least one of a temperature of the photonic integrated circuit package or a coupling efficiency between the light source and the photonic integrated circuit package, the integrated sensor configured to cooperate with the voltage source to transition the tunable liquid crystal lens to the light steering state from the base state by varying the second voltage in response to each determination of the operating parameter satisfying a threshold.

2. The photonic integrated circuit package of claim 1, wherein the operating parameter satisfying the threshold indicates a misalignment of the second optics and the integrated waveguide.

3. The photonic integrated circuit package of claim 2, wherein the tunable liquid crystal lens is one of multiple tunable liquid crystal lenses.

4. The photonic integrated circuit package of claim 1, wherein
   each of the first exterior substrate, the second exterior substrate, the substrate, the first electrode, and the second electrode are transparent to wavelengths of the light output.

5. The photonic integrated circuit package of claim 1, wherein the tunable liquid crystal lens is variably tunable, such that the tunable liquid crystal lens may increase steering of the light output as the second voltage varies.

6. The photonic integrated circuit package of claim 1, wherein the tunable liquid crystal lens is dynamically tunable, such that the tunable liquid crystal lens steers the light output in response to a change in the operating parameter of the photonic integrated circuit package.

7. The photonic integrated circuit package of claim 6, wherein the operating parameter is the temperature of the photonic integrated circuit package.

8. The photonic integrated circuit package of claim 6, wherein the tunable liquid crystal lens is both dynamically tunable and variably tunable.

9. The photonic integrated circuit package of claim 1, further comprising an index-matching material positioned between the tunable liquid crystal lens and either or both of the first optics and the second optics.

10. The photonic integrated circuit package of claim 1, wherein detection of changes in the operating parameter of the photonic integrated circuit package occurs while the light source is emitting light.

\* \* \* \* \*